US 12,074,893 B2
Aug. 27, 2024

(12) United States Patent
Dong et al.

(10) Patent No.: US 12,074,893 B2
(45) Date of Patent: *Aug. 27, 2024

(54) SYSTEM, METHOD, AND COMPUTER PROGRAM PRODUCT FOR USER NETWORK ACTIVITY ANOMALY DETECTION

(71) Applicant: Visa International Service Association, San Francisco, CA (US)

(72) Inventors: Bo Dong, Richardson, TX (US); Yuhang Wu, Santa Clara, CA (US); Yu-San Lin, San Francisco, CA (US); Michael Yeh, Newark, CA (US); Hao Yang, San Jose, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/202,405

(22) Filed: May 26, 2023

(65) Prior Publication Data

US 2023/0308464 A1    Sep. 28, 2023

Related U.S. Application Data

(63) Continuation of application No. 17/763,282, filed as application No. PCT/US2021/055374 on Oct. 18, 2021, now Pat. No. 11,711,391.

(Continued)

(51) Int. Cl.
    *H04L 9/40* (2022.01)
(52) U.S. Cl.
    CPC ...... *H04L 63/1425* (2013.01); *H04L 63/1416* (2013.01); *H04L 63/1475* (2013.01)

(58) Field of Classification Search
    CPC ............ H04L 63/1425; H04L 63/1416; H04L 63/1475; H04L 63/1408; H04L 9/40;
    (Continued)

(56) References Cited

U.S. PATENT DOCUMENTS 8,813,236 B1 * 8/2014 Saha .................. H04L 63/1408
                                                         726/25
9,367,823 B1 * 6/2016 Mihalik ................. G06Q 40/06
(Continued)

FOREIGN PATENT DOCUMENTS

CA        2933423 A1   12/2016
CN      106506485 A    3/2017
(Continued)

OTHER PUBLICATIONS

Aggarwal et al., "Evolutionary Network Analysis: A Survey", ACM Computing Surveys, 2014, 10 pages, vol. 47:1.
(Continued)

*Primary Examiner* — Sarah Su
(74) *Attorney, Agent, or Firm* — The Webb Law Firm

(57) ABSTRACT

Disclosed are a system, method, and computer program product for user network activity anomaly detection. The method includes generating a multilayer graph from network resource data, and generating an adjacency matrix associated with each layer of the multilayer graph to produce a plurality of adjacency matrices. The method further includes assigning a weight to each adjacency matrix to produce a plurality of weights, and generating a merged single layer graph by merging the plurality of layers based on a weighted sum of the plurality of adjacency matrices using the plurality of weights. The method further includes generating a set of anomaly scores by generating, for each node in the merged single layer graph, an anomaly score. The method further includes determining a set of anomalous users based on the (Continued)

set of anomaly scores, detecting fraudulent network activity based on the set of anomalous users, and executing a fraud mitigation process.

20 Claims, 5 Drawing Sheets

Related U.S. Application Data

(60) Provisional application No. 63/092,670, filed on Oct. 16, 2020.

(58) Field of Classification Search
CPC ...... G06N 3/0395; G06N 3/09; G06N 3/0985; G06N 3/042; G06N 3/098; G06N 3/088; G08B 23/00
See application file for complete search history.

(56) References Cited

U.S. PATENT DOCUMENTS

| | | | |
|---|---|---|---|
| 11,711,391 B2* | 7/2023 | Dong ................ | H04L 63/1425 726/22 |
| 2011/0145137 A1* | 6/2011 | Driemeyer ............ | G06Q 20/10 705/39 |
| 2013/0293551 A1 | 11/2013 | Erez et al. | |
| 2014/0245443 A1* | 8/2014 | Chakraborty ....... | H04L 63/1425 726/23 |
| 2016/0055409 A1* | 2/2016 | Majumdar ............ | G06N 3/042 706/20 |
| 2016/0219066 A1 | 7/2016 | Vasseur et al. | |
| 2016/0371489 A1 | 12/2016 | Puri et al. | |
| 2017/0063900 A1 | 3/2017 | Muddu et al. | |
| 2017/0323028 A1 | 11/2017 | Jonker et al. | |
| 2018/0219888 A1 | 8/2018 | Apostolopoulos | |
| 2018/0288063 A1 | 10/2018 | Koottayi et al. | |
| 2019/0005384 A1 | 1/2019 | Sundar et al. | |
| 2019/0050562 A1* | 2/2019 | Rhee .................... | G06F 21/566 |
| 2019/0132224 A1 | 5/2019 | Verma et al. | |
| 2019/0149396 A1* | 5/2019 | Zafer ................. | H04L 41/0654 709/224 |
| 2020/0374199 A1 | 11/2020 | Arrabolu et al. | |
| 2021/0256355 A1* | 8/2021 | Chen ...................... | G06N 3/08 |
| 2022/0405580 A1 | 12/2022 | Zheng et al. | |
| 2023/0089481 A1* | 3/2023 | Liu ...................... | G06N 3/0455 706/15 |
| 2023/0104448 A1* | 4/2023 | Sivakumar ............... | G06N 3/08 706/25 |
| 2023/0110941 A1* | 4/2023 | Makhija ................ | G06F 40/284 709/224 |
| 2023/0362175 A1* | 11/2023 | Li .......................... | H04L 41/16 |
| 2023/0388328 A1* | 11/2023 | Komashinskiy ...... | G06F 21/552 |

FOREIGN PATENT DOCUMENTS

| | | | | |
|---|---|---|---|---|
| CN | 111159395 A | 5/2020 | | |
| CN | 114553475 A | 5/2022 | | |
| CN | 114978586 A | 8/2022 | | |
| WO | 2019213426 A1 | 11/2019 | | |
| WO | WO-2020046260 A1 * | 3/2020 | | |
| WO | 2020114122 A1 | 6/2020 | | |
| WO | WO-2020113208 A1 * | 6/2020 | ......... | G06F 16/2237 |
| WO | WO-2020214636 A1 * | 10/2020 | ........... | G06F 16/322 |
| WO | WO-2023041992 A1 * | 3/2023 | | |

OTHER PUBLICATIONS

Akoglu et al., "Graph-based Anomaly Detection and Description: A Survey", 68 pages.
Bindu et al., "Discovering suspicious behavior in multilayer social networks", Computers in Human Behavior, 2017, 20 pages.
Bolton et al., "Unsupervised Profiling Methods for Fraud Detection", 16 pages.
Bridges et al., "A Multi-Level Anomaly Detection Algorithm for Time-Varying Graph Data with Interactive Visualization", 2015, 23 pages.
Chandola et al., "Anomaly Detection: A Survey", ACM Computing Surveys, 2009, 72 pages.
Chen et al., "Community-based anomaly detection in evolutionary networks", J Intell Inf Syst, 2012, pp. 59-85, vol. 39.
Dickison et al., "Multilayer Social Networks", Cambridge University Press, 2016, 201 pages.
Dimopoulos et al., "Detecting Network Performance Anomalies with Contextual Anomaly Detection", IEEE, 2017, 6 pages.
Ding et al., "Deep Anomaly Detection on Attributed Networks", SIAM, 2019, 9 pages.
Eberle et al., "Anomaly detection in data represented as graphs", Intelligent Data Analysis, 2007, pp. 663-689, vol. 11.
Eldardiry et al., "Multi-source fusion for anomaly detection: using across-domain and across-time peer-group consistency checks", Journal of Wireless Mobile Networks, Ubiquitous Computing, and Dependable Applications, pp. 39-58, vol. 5:2.
Goldstein et al., "Histogram-based Outlier Score (HBOS): A fast Unsupervised Anomaly Detection Algorithm", Poster and Demo Track of the 35th German Conference on Artificial Intelligence, 2012, pp. 59-63.
Hayes et al., "Contextual Anomaly Detection in Big Sensor Data", Proc. of the 3rd Int. Congress on Big Data, Jun. 27-Jul. 2, 2014, 9 pages.
Interdonato et al., "Multilayer network simplification: approaches, models and methods", Elsevier, 2020, 49 pages.
Kim et al., "Stock fraud detection using peer group analysis", Expert Systems with Applications, 2012, pp. 8986-8992, vol. 39.
Kivela et al., "Multilayer Networks", Mar. 4, 2014, 59 pages.
Li et al., "Weighted Consensus Clustering", SIAM, 2021, pp. 798-809.
Liu et al., "Accelerated Local Anomaly Detection via Resolving Attributed Networks", Proceedings of the Twenty-Sixth International Joint Conference on Artificial Intelligence, pp. 2337-2343.
Liu et al., "Using Consensus Clustering for Multi-view Anomaly Detection", IEEE CS Security and Privacy Workshops, 2012, pp. 117-124.
Madden, "Intel Lab Data", 2 pages, Oct. 12, 2021.
Mittal et al., "Anomaly Detection in Multiplex Networks", Procedia Computer Science, 2018, pp. 609-616, vol. 125.
Noble et al., "Graph-Based Anomaly Detection", SIGKDD, 2003, pp. 631-636.
Rayana et al., "An Ensemble Approach for Event Detection and Characterization in Dynamic Graphs", ODD, 2014, 10 pages.
Thiprungsri et al., "Cluster Analysis for Anomaly Detection in Accounting Data: An Audit Approach", The International Journal of Digital Accounting Research, 2011, pp. 69-84, vol. 11.
Vengertsev et al., "Anomaly Detection in Graph: Unsupervised Learning, Graph-based Features and Deep Architecture", Technical Report, 8 pages.
Xie et al., "Unsupervised Deep Embedding for Clustering Analysis", Proceedings of the 33rd International Conference on Machine Learning, 2016, 10 pages.
Zhang et al., "A Framework for Deep Constrained Clustering—Algorithms and Advances", 16 pages.
Zhao et al., "PyOD: A Python Toolbox for Scalable Outlier Detection", Journal of Machine Learning Research, 2019, pp. 1-7, vol. 20.
Zitnik et al., "Predicting multicellular function through multi-layer tissue networks", Bioinformatics, 2017, pp. i190-i198, vol. 33.

\* cited by examiner

SYSTEM, METHOD, AND COMPUTER PROGRAM PRODUCT FOR USER NETWORK ACTIVITY ANOMALY DETECTION

CROSS-REFERENCE TO RELATED APPLICATIONS

This application is a continuation of U.S. patent application Ser. No. 17/763,282, filed Oct. 18, 2021, which is the United States national phase of International Application No. PCT/US2021/055374, filed Oct. 18, 2021, and claims priority to U.S. Provisional Patent Application No. 63/092,670, filed Oct. 16, 2020, the disclosures of which are hereby incorporated by reference in their entireties.

BACKGROUND

1. Technical Field

This disclosure relates generally to network behavior analysis and, in non-limiting embodiments or aspects, to systems, methods, and computer program products for anomaly detection with multi-layer graphing of behaviors.

2. Technical Considerations

Detecting anomalies within a population is beneficial for many different types of systems. However, typical anomaly detection is based on a single layer of information. This does not match conditions that are typically found in real world applications where multiple inputs may be necessary to determine an anomaly within a population. Moreover, a given user's behavior may or may not be anomalous based on a comparison to the activity of the user's peers. Therefore, it is necessary to divide a population into distinct groups based on relationships between members of the group, and to identify anomalies within a group based on multiple inputs. Doing so will increase accuracy in detecting anomalous network activity, which will, in turn, conserve network resources through the accurate identification and responding to anomalous behavior, either by mitigating the behavior or reallocating network resources to accommodate anomalous behavior.

SUMMARY

According to some non-limiting embodiments or aspects, provided is a computer-implemented method for user network activity anomaly detection. The method includes receiving, with at least one processor, network resource data associated with network resource activity of a plurality of users on a network comprising at least one network resource. The method also includes generating, with at least one processor, a plurality of layers of a multilayer graph from the network resource data. Each layer of the plurality of layers includes a plurality of nodes connected by a plurality of edges. Each node of the plurality of nodes is associated with a user of the plurality of users. Each edge of the plurality of edges represents an interdependency of the nodes. Each layer represents interdependencies of nodes according to a unique parameter of network resource activity. The method further includes generating, with at least one processor, an adjacency matrix associated with each layer of the plurality of layers to produce a plurality of adjacency matrices. The method further includes assigning, with at least one processor, a weight to each adjacency matrix of the plurality of adjacency matrices to produce a plurality of weights. The method further includes generating, with at least one processor, a merged single layer graph by merging the plurality of layers based on a weighted sum of the plurality of adjacency matrices using the plurality of weights, the merged single layer graph including a merged set of nodes. The method further includes generating, with at least one processor, a set of anomaly scores by generating, for each node in the merged set of nodes, an anomaly score based on an attribute of the node and at least one attribute of at least one peer node to which the node is connected in the merged set of nodes. The method further includes determining, with at least one processor, a set of anomalous users of the plurality of users based on the set of anomaly scores.

In some non-limiting embodiments or aspects, the method may further include (a) modifying, with at least one processor, the plurality of weights based on at least one loss function to produce a modified plurality of weights. The method may further include (b) generating, with at least one processor, an updated merged single layer graph by merging the plurality of layers based on a weighted sum of the plurality of adjacency matrices using the modified plurality of weights. The method may further include (c) generating, with at least one processor, a new set of anomaly scores based on the updated merged single layer graph. The method may further include (d) updating, with at least one processor, the set of anomalous users based on the new set of anomaly scores.

In some non-limiting embodiments or aspects, the at least one loss function may include a weighted sum of at least two loss functions. The at least two loss functions may include a loss function based at least partly on the merged single layer graph. The method may further include repeatedly executing steps (a)-(d), above, in an unsupervised training environment by altering weights of the weighted sum of the at least two loss functions before each new execution of step (a).

In some non-limiting embodiments or aspects, the at least two loss functions may further include a loss function based at least partly on input feedback of externally identified anomalous users. The method may further include repeatedly executing steps (a)-(d), above, in an at least partly supervised training environment by receiving new input feedback of externally identified anomalous users and by altering weights of the weighted sum of the at least two loss functions before each new execution of step (a).

In some non-limiting embodiments or aspects, the method may further include detecting, with at least one processor, fraudulent network activity based on the set of anomalous users. The method may further include, in response to detecting fraudulent network activity, executing, with at least one processor, at least one fraud mitigation process.

According to some non-limiting embodiments or aspects, provided is a system for user network activity anomaly detection. The system includes a server including at least one processor. The server is programmed or configured to receive network resource data associated with network resource activity of a plurality of users on a network including at least one network resource. The server is also programmed or configured to generate a plurality of layers of a multilayer graph from the network resource data. Each layer of the plurality of layers includes a plurality of nodes connected by a plurality of edges. Each node of the plurality of nodes is associated with a user of the plurality of users. Each edge of the plurality of edges represents an interdependency of the nodes. Each layer represents interdependencies of nodes according to a unique parameter of network resource activity. The server is further programmed or configured to generate an adjacency matrix associated with each layer of the plurality of layers to produce a plurality of adjacency matrices. The server is further programmed or configured to assign a weight to each adjacency matrix of the plurality of adjacency matrices to produce a plurality of weights. The server is further programmed or configured to generate a merged single layer graph by merging the plurality of layers based on a weighted sum of the plurality of adjacency matrices using the plurality of weights, the merged single layer graph including a merged set of nodes. The server is further programmed or configured to generate a set of anomaly scores by generating, for each node in the merged set of nodes, an anomaly score based on an attribute of the node and at least one attribute of at least one peer node to which the node is connected in the merged set of nodes. The server is further programmed or configured to determine a set of anomalous users of the plurality of users based on the set of anomaly scores.

In some non-limiting embodiments or aspects, the server may be further programmed or configured to (a) modify the plurality of weights based on at least one loss function to produce a modified plurality of weights. The server may be further programmed or configured to (b) generate an updated merged single layer graph by merging the plurality of layers based on a weighted sum of the plurality of adjacency matrices using the modified plurality of weights. The server may be further programmed or configured to (c) generate a new set of anomaly scores based on the updated merged single layer graph. The server may be further programmed or configured to (d) update the set of anomalous users based on the new set of anomaly scores.

In some non-limiting embodiments or aspects, the at least one loss function may include a weighted sum of at least two loss functions. The at least two loss functions may include a loss function based at least partly on the merged single layer graph. The server may be further programmed or configured to repeatedly execute steps (a)-(d) in an unsupervised training environment by altering weights of the weighted sum of the at least two loss functions before each new execution of step (a).

In some non-limiting embodiments or aspects, the at least two loss functions may further include a loss function based at least partly on input feedback of externally identified anomalous users. The server may be further programmed or configured to repeatedly execute steps (a)-(d) in an at least partly supervised training environment by receiving new input feedback of externally identified anomalous users and by altering weights of the weighted sum of the at least two loss functions before each new execution of step (a).

In some non-limiting embodiments or aspects, the server may be further programmed or configured to detect fraudulent network activity based on the set of anomalous users. The server may be further programmed or configured to, in response to detecting fraudulent network activity, execute at least one fraud mitigation process.

According to some non-limiting embodiments or aspects, provided is a computer program product for user network activity anomaly detection. The computer program product includes at least one non-transitory computer-readable medium including program instructions that, when executed by at least one processor, cause the at least one processor to receive network resource data associated with network resource activity of a plurality of users on a network comprising at least one network resource. The program instructions also cause the at least one processor to generate a plurality of layers of a multilayer graph from the network resource data. Each layer of the plurality of layers includes a plurality of nodes connected by a plurality of edges. Each node of the plurality of nodes is associated with a user of the plurality of users. Each edge of the plurality of edges represents an interdependency of the nodes. Each layer represents interdependencies of nodes according to a unique parameter of network resource activity. The program instructions further cause the at least one processor to generate an adjacency matrix associated with each layer of the plurality of layers to produce a plurality of adjacency matrices. The program instructions further cause the at least one processor to assign a weight to each adjacency matrix of the plurality of adjacency matrices to produce a plurality of weights. The program instructions further cause the at least one processor to generate a merged single layer graph by merging the plurality of layers based on a weighted sum of the plurality of adjacency matrices using the plurality of weights, the merged single layer graph comprising a merged set of nodes. The program instructions further cause the at least one processor to generate a set of anomaly scores by generating, for each node in the merged set of nodes, an anomaly score based on an attribute of the node and at least one attribute of at least one peer node to which the node is connected in the merged set of nodes. The program instructions further cause the at least one processor to determine a set of anomalous users of the plurality of users based on the set of anomaly scores.

In some non-limiting embodiments or aspects, the program instructions may further cause the at least one processor to (a) modify the plurality of weights based on at least one loss function to produce a modified plurality of weights. The program instructions may further cause the at least one processor to (b) generate an updated merged single layer graph by merging the plurality of layers based on a weighted sum of the plurality of adjacency matrices using the modified plurality of weights. The program instructions may further cause the at least one processor to (c) generate a new set of anomaly scores based on the updated merged single layer graph. The program instructions may further cause the at least one processor to (d) update the set of anomalous users based on the new set of anomaly scores.

In some non-limiting embodiments or aspects, the at least one loss function may include a weighted sum of at least two loss functions. The at least two loss functions may also include a loss function based at least partly on the merged single layer graph.

In some non-limiting embodiments or aspects, the at least two loss functions may include a loss function based at least partly on input feedback of externally identified anomalous users. The program instructions may further cause the at least one processor to repeatedly execute steps (a)-(d) in an at least partly supervised training environment by receiving new input feedback of externally identified anomalous users and by altering weights of the weighted sum of the at least two loss functions before each new execution of step (a).

In some non-limiting embodiments or aspects, the program instructions may further cause the at least one processor to detect fraudulent network activity based on the set of anomalous users. The program instructions may further cause the at least one processor to, in response to detecting fraudulent network activity, execute at least one fraud mitigation process.

Further non-limiting embodiments or aspects will be set forth in the following numbered clauses:

Clause 1: A computer-implemented method comprising: receiving, with at least one processor, network resource data associated with network resource activity of a plurality of users on a network comprising at least one network resource; generating, with at least one processor, a plurality of layers of a multilayer graph from the network resource data, wherein each layer of the plurality of layers comprises a plurality of nodes connected by a plurality of edges, each node of the plurality of nodes is associated with a user of the plurality of users, each edge of the plurality of edges represents an interdependency of the nodes, and each layer represents interdependencies of nodes according to a unique parameter of network resource activity; generating, with at least one processor, an adjacency matrix associated with each layer of the plurality of layers to produce a plurality of adjacency matrices; assigning, with at least one processor, a weight to each adjacency matrix of the plurality of adjacency matrices to produce a plurality of weights; generating, with at least one processor, a merged single layer graph by merging the plurality of layers based on a weighted sum of the plurality of adjacency matrices using the plurality of weights, the merged single layer graph comprising a merged set of nodes; generating, with at least one processor, a set of anomaly scores by generating, for each node in the merged set of nodes, an anomaly score based on an attribute of the node and at least one attribute of at least one peer node to which the node is connected in the merged set of nodes; and determining, with at least one processor, a set of anomalous users of the plurality of users based on the set of anomaly scores.

Clause 2: The computer-implemented method of clause 1, further comprising: (a) modifying, with at least one processor, the plurality of weights based on at least one loss function to produce a modified plurality of weights; (b) generating, with at least one processor, an updated merged single layer graph by merging the plurality of layers based on a weighted sum of the plurality of adjacency matrices using the modified plurality of weights; (c) generating, with at least one processor, a new set of anomaly scores based on the updated merged single layer graph; and (d) updating, with at least one processor, the set of anomalous users based on the new set of anomaly scores.

Clause 3: The computer-implemented method of clause 1 or 2, wherein the at least one loss function comprises a weighted sum of at least two loss functions, and wherein the at least two loss functions comprises a loss function based at least partly on the merged single layer graph.

Clause 4: The computer-implemented method of any of clauses 1-3, wherein the at least two loss functions further comprises a loss function based at least partly on input feedback of externally identified anomalous users.

Clause 5: The computer-implemented method of any of clauses 1-4, further comprising repeatedly executing steps (a)-(d) in an unsupervised training environment by altering weights of the weighted sum of the at least two loss functions before each new execution of step (a).

Clause 6: The computer-implemented method of any of clauses 1-5, further comprising repeatedly executing steps (a)-(d) in an at least partly supervised training environment by receiving new input feedback of externally identified anomalous users and by altering weights of the weighted sum of the at least two loss functions before each new execution of step (a).

Clause 7: The computer-implemented method of any of clauses 1-6, further comprising: detecting, with at least one processor, fraudulent network activity based on the set of anomalous users; and, in response to detecting fraudulent network activity, executing, with at least one processor, at least one fraud mitigation process.

Clause 8: A system comprising a server comprising at least one processor, the server being programmed or configured to: receive network resource data associated with network resource activity of a plurality of users on a network comprising at least one network resource; generate a plurality of layers of a multilayer graph from the network resource data, wherein each layer of the plurality of layers comprises a plurality of nodes connected by a plurality of edges, each node of the plurality of nodes is associated with a user of the plurality of users, each edge of the plurality of edges represents an interdependency of the nodes, and each layer represents interdependencies of nodes according to a unique parameter of network resource activity; generate an adjacency matrix associated with each layer of the plurality of layers to produce a plurality of adjacency matrices; assign a weight to each adjacency matrix of the plurality of adjacency matrices to produce a plurality of weights; generate a merged single layer graph by merging the plurality of layers based on a weighted sum of the plurality of adjacency matrices using the plurality of weights, the merged single layer graph comprising a merged set of nodes; generate a set of anomaly scores by generating, for each node in the merged set of nodes, an anomaly score based on an attribute of the node and at least one attribute of at least one peer node to which the node is connected in the merged set of nodes; and determine a set of anomalous users of the plurality of users based on the set of anomaly scores.

Clause 9: The system of clause 8, wherein the server is further programmed or configured to: (a) modify the plurality of weights based on at least one loss function to produce a modified plurality of weights; (b) generate an updated merged single layer graph by merging the plurality of layers based on a weighted sum of the plurality of adjacency matrices using the modified plurality of weights; (c) generate a new set of anomaly scores based on the updated merged single layer graph; and (d) update the set of anomalous users based on the new set of anomaly scores.

Clause 10: The system of clause 8 or 9, wherein the at least one loss function comprises a weighted sum of at least two loss functions, and wherein the at least two loss functions comprises a loss function based at least partly on the merged single layer graph.

Clause 11: The system of any of clauses 8-10, wherein the at least two loss functions further comprises a loss function based at least partly on input feedback of externally identified anomalous users.

Clause 12: The system of any of clauses 8-11, wherein the server is further programmed or configured to repeatedly execute steps (a)-(d) in an unsupervised training environment by altering weights of the weighted sum of the at least two loss functions before each new execution of step (a).

Clause 13: The system of any of clauses 8-12, wherein the server is further programmed or configured to repeatedly execute steps (a)-(d) in an at least partly supervised training environment by receiving new input feedback of externally identified anomalous users and by altering weights of the weighted sum of the at least two loss functions before each new execution of step (a).

Clause 14: The system of any of clauses 8-13, wherein the server is further programmed or configured to: detect fraudulent network activity based on the set of anomalous users; and, in response to detecting fraudulent network activity, execute at least one fraud mitigation process.

Clause 15: A computer program product comprising at least one non-transitory computer-readable medium including program instructions that, when executed by at least one processor, cause the at least one processor to: receive network resource data associated with network resource activity of a plurality of users on a network comprising at least one network resource; generate a plurality of layers of a multilayer graph from the network resource data, wherein each layer of the plurality of layers comprises a plurality of nodes connected by a plurality of edges, each node of the plurality of nodes is associated with a user of the plurality of users, each edge of the plurality of edges represents an interdependency of the nodes, and each layer represents interdependencies of nodes according to a unique parameter of network resource activity; generate an adjacency matrix associated with each layer of the plurality of layers to produce a plurality of adjacency matrices; assign a weight to each adjacency matrix of the plurality of adjacency matrices to produce a plurality of weights; generate a merged single layer graph by merging the plurality of layers based on a weighted sum of the plurality of adjacency matrices using the plurality of weights, the merged single layer graph comprising a merged set of nodes; generate a set of anomaly scores by generating, for each node in the merged set of nodes, an anomaly score based on an attribute of the node and at least one attribute of at least one peer node to which the node is connected in the merged set of nodes; and determine a set of anomalous users of the plurality of users based on the set of anomaly scores.

Clause 16: The computer program product of clause 15, wherein the program instructions further cause the at least one processor to: (a) modify the plurality of weights based on at least one loss function to produce a modified plurality of weights; (b) generate an updated merged single layer graph by merging the plurality of layers based on a weighted sum of the plurality of adjacency matrices using the modified plurality of weights; (c) generate a new set of anomaly scores based on the updated merged single layer graph; and (d) update the set of anomalous users based on the new set of anomaly scores.

Clause 17: The computer program product of clause 15 or 16, wherein the at least one loss function comprises a weighted sum of at least two loss functions, and wherein the at least two loss functions comprises a loss function based at least partly on the merged single layer graph.

Clause 18: The computer program product of any of clauses 15-17, wherein the at least two loss functions further comprises a loss function based at least partly on input feedback of externally identified anomalous users.

Clause 19: The computer program product of any of clauses 15-18, wherein the program instructions further cause the at least one processor to repeatedly execute steps (a)-(d) in an at least partly supervised training environment by receiving new input feedback of externally identified anomalous users and by altering weights of the weighted sum of the at least two loss functions before each new execution of step (a).

Clause 20: The computer program product of any of clauses 15-19, wherein the program instructions further cause the at least one processor to: detect fraudulent network activity based on the set of anomalous users; and, in response to detecting fraudulent network activity, execute at least one fraud mitigation process.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the disclosure are explained in greater detail below with reference to the exemplary embodiments that are illustrated in the accompanying schematic figures, in which.

Figure 1:
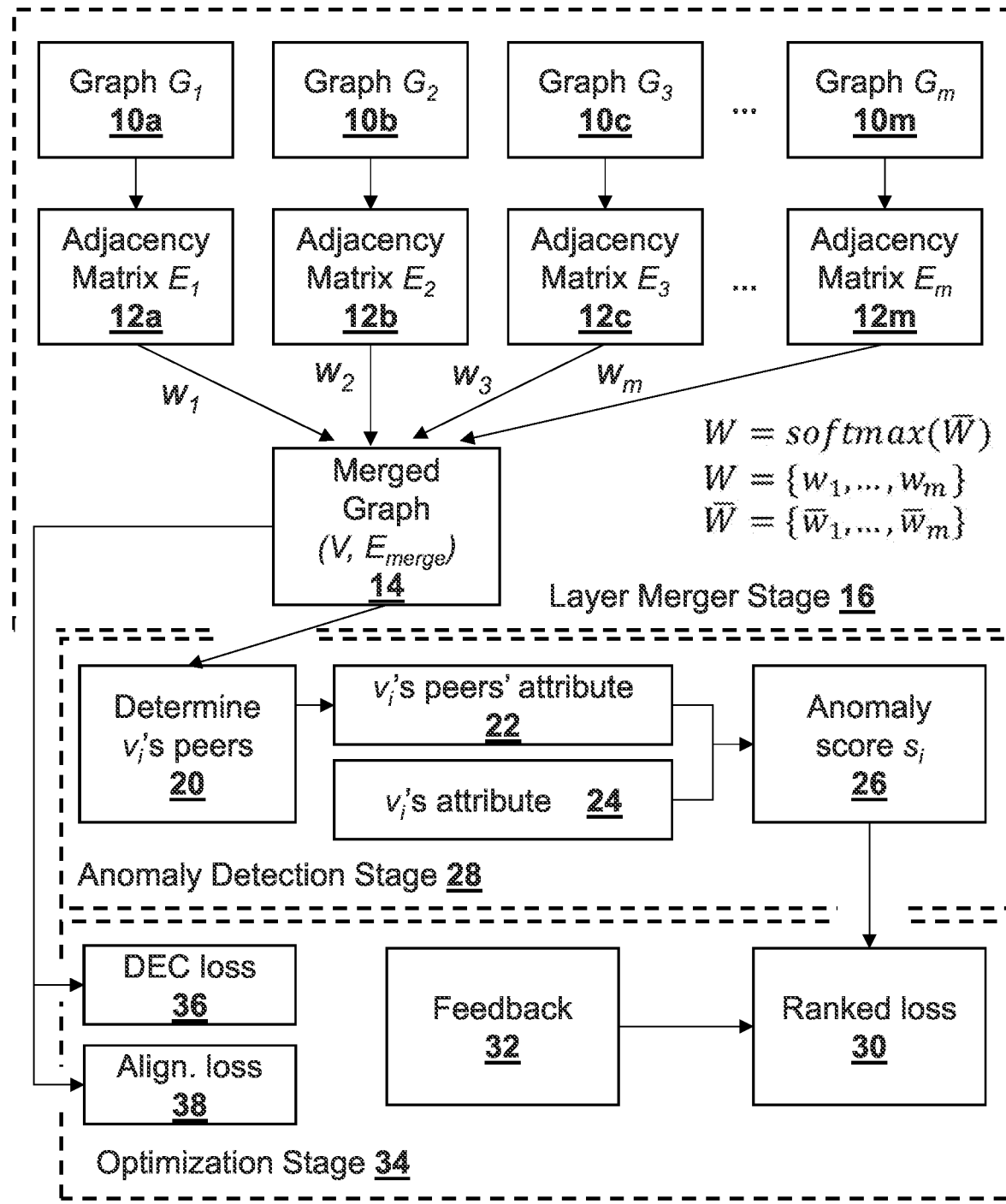
FIG. 1 is a process diagram of a method for multi-layer graph anomaly detection according to some non-limiting embodiments or aspects.

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

For purposes of the description hereinafter, the terms "upper", "lower", "right", "left", "vertical", "horizontal", "top", "bottom", "lateral", "longitudinal," and derivatives thereof shall relate to non-limiting embodiments or aspects as they are oriented in the drawing figures. However, it is to be understood that non-limiting embodiments or aspects may assume various alternative variations and step sequences, except where expressly specified to the contrary. It is also to be understood that the specific devices and processes illustrated in the attached drawings, and described in the following specification, are simply exemplary embodiments or aspects. Hence, specific dimensions and other physical characteristics related to the embodiments disclosed herein are not to be considered as limiting.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

Some non-limiting embodiments or aspects are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, and/or the like.

As used herein, the term "acquirer institution" may refer to an entity licensed and/or approved by a transaction service provider to originate transactions (e.g., payment transactions) using a payment device associated with the transaction service provider. The transactions the acquirer institution may originate may include payment transactions (e.g., purchases, original credit transactions (OCTs), account funding transactions (AFTs), and/or the like). In some non-limiting embodiments, an acquirer institution may be a financial institution, such as a bank. As used herein, the term "acquirer system" may refer to one or more computing devices operated by or on behalf of an acquirer institution, such as a server computer executing one or more software applications.

As used herein, the term "account identifier" may include one or more primary account numbers (PANs), tokens, or other identifiers associated with a customer account. The term "token" may refer to an identifier that is used as a substitute or replacement identifier for an original account identifier, such as a PAN. Account identifiers may be alphanumeric or any combination of characters and/or symbols. Tokens may be associated with a PAN or other original account identifier in one or more data structures (e.g., one or more databases, and/or the like) such that they may be used to conduct a transaction without directly using the original account identifier. In some examples, an original account identifier, such as a PAN, may be associated with a plurality of tokens for different individuals or purposes.

As used herein, the term "communication" may refer to the reception, receipt, transmission, transfer, provision, and/or the like, of data (e.g., information, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit processes information received from the first unit and communicates the processed information to the second unit.

As used herein, the term "computing device" may refer to one or more electronic devices configured to process data. A computing device may, in some examples, include the necessary components to receive, process, and output data, such as a processor, a display, a memory, an input device, a network interface, and/or the like. A computing device may be a mobile device. As an example, a mobile device may include a cellular phone (e.g., a smartphone or standard cellular phone), a portable computer, a wearable device (e.g., watches, glasses, lenses, clothing, and/or the like), a personal digital assistant (PDA), and/or other like devices. A computing device may also be a desktop computer or other form of non-mobile computer. An "application" or "application program interface" (API) may refer to computer code or other data sorted on a computer-readable medium that may be executed by a processor to facilitate the interaction between software components, such as a client-side front-end and/or server-side back-end for receiving data from the client. An "interface" may refer to a generated display, such as one or more graphical user interfaces (GUIs) with which a user may interact, either directly or indirectly (e.g., through a keyboard, mouse, etc.).

As used herein, the terms "electronic wallet" and "electronic wallet application" refer to one or more electronic devices and/or software applications configured to initiate and/or conduct payment transactions. For example, an electronic wallet may include a mobile device executing an electronic wallet application, and may further include server-side software and/or databases for maintaining and providing transaction data to the mobile device. An "electronic wallet provider" may include an entity that provides and/or maintains an electronic wallet for a customer, such as Google Pay®, Android Pay®, Apple Pay®, Samsung Pay®, and/or other like electronic payment systems. In some non-limiting examples, an issuer bank may be an electronic wallet provider.

As used herein, the term "issuer institution" may refer to one or more entities, such as a bank, that provide accounts to customers for conducting transactions (e.g., payment transactions), such as initiating credit and/or debit payments. For example, an issuer institution may provide an account identifier, such as a primary account number (PAN), to a customer that uniquely identifies one or more accounts associated with that customer. The account identifier may be embodied on a portable financial device, such as a physical financial instrument, e.g., a payment card, and/or may be electronic and used for electronic payments. The term "issuer system" refers to one or more computer devices operated by or on behalf of an issuer institution, such as a server computer executing one or more software applications. For example, an issuer system may include one or more authorization servers for authorizing a transaction.

As used herein, the term "merchant" may refer to an individual or entity that provides goods and/or services, or access to goods and/or services, to customers based on a transaction, such as a payment transaction. The term "merchant" or "merchant system" may also refer to one or more computer systems operated by or on behalf of a merchant, such as a server computer executing one or more software applications. A "point-of-sale (POS) system," as used herein, may refer to one or more computers and/or peripheral devices used by a merchant to engage in payment transactions with customers, including one or more card readers, scanning devices (e.g., code scanners), Bluetooth® communication receivers, near-field communication (NFC) receivers, radio frequency identification (RFID) receivers, and/or other contactless transceivers or receivers, contact-based receivers, payment terminals, computers, servers, input devices, and/or other like devices that can be used to initiate a payment transaction.

As used herein, the term "payment device" may refer to a portable financial device, an electronic payment device, a payment card (e.g., a credit or debit card), a gift card, a smartcard, smart media, a payroll card, a healthcare card, a wristband, a machine-readable medium containing account information, a keychain device or fob, an RFID transponder, a retailer discount or loyalty card, a cellular phone, an electronic wallet mobile application, a PDA, a pager, a security card, a computing device, an access card, a wireless terminal, a transponder, and/or the like. In some non-limiting embodiments, the payment device may include volatile or non-volatile memory to store information (e.g., an account identifier, a name of the account holder, and/or the like).

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like, operated by or on behalf of a payment gateway.

As used herein, the term "server" may refer to or include one or more computing devices that are operated by or facilitate communication and processing for multiple parties in a network environment, such as the Internet, although it will be appreciated that communication may be facilitated over one or more public or private network environments and that various other arrangements are possible. Further, multiple computing devices (e.g., servers, POS devices, mobile devices, etc.) directly or indirectly communicating in the network environment may constitute a "system." Reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa® or any other entity that processes transactions. The term "transaction processing system" may refer to one or more computer systems operated by or on behalf of a transaction service provider, such as a transaction processing server executing one or more software applications. A transaction processing server may include one or more processors and, in some non-limiting embodiments, may be operated by or on behalf of a transaction service provider.

As used herein, an electronic payment processing network may refer to the communications between one or more entities for processing the transfer of monetary funds to one or more transactions. The electronic payment processing network may include a merchant system, an acquirer system, a transaction service provider, and an issuer system.

The systems, methods, and computer program products described herein provide numerous technical advantages in systems for determining anomalies. For example, identifying anomalies in behaviors can be an important aspect in identifying security risks of employees for a company. This may be difficult to achieve when looking at only one aspect of an employee's activities. Non-limiting embodiments described herein provide for increased accuracy in identifying anomalous behavior. By identifying peer groups of employees and comparing the employees to those peer groups, identifying anomalous behavior can be achieved with decreased computing resources, such as through decreasing time for analysis and by decreasing the amount of collected historic data necessary for comparison. Improved user-peer identification and anomaly detection improves the efficiency (e.g., lowers processing time and capacity) of subsequent reliant systems, such as fraud detection systems. Allowing for user input to alter the results of anomalous ranking can also increase accuracy of the system.

In non-limiting embodiments or aspects, the system begins with the merger of disparate graph layers of a multi-layer graph. As used herein, "graph" may refer to the relational representation of graph theory, in which mathematical structures including nodes (e.g., vertices, points, etc.) are connected by edges (e.g., links, lines, etc.) to represent pairwise relationships between nodes. A merged single layer graph may be produced using the weighted sum of adjacency matrices, which represent the connectivity of each layer of the multi-layer graph. As used herein, an "adjacency matrix" may refer to a matrix used to represent whether pairs of vertices are adjacent (e.g., connected) or not in a graph, and whether that connection has a relationship value (e.g., cost, strength of interdependency, etc.).

The system then proceeds to anomaly detection, which may receive the results of the above merging process. For a specific node (e.g., a user), a node's peers may be found from the cluster the specific node belongs to. A function to compute the anomaly score for each employee is provided herein. The output of the anomaly detection portion may be a set of abnormal users with corresponding anomaly scores. A threshold may be set for anomaly scores, and it may be determined if a user is anomalous or not according to the threshold. Based on a third party's (e.g., expert personnel, user, etc.) feedback and/or loss functions based on the graph merger, the system may be adjusted for better performance.

Described in further detail below is a multilayer graph-based anomaly detection system, which uses multiple clusters generated by layers in a graph, employs weighted layer merger, and detects anomalous nodes (e.g., users) in graphs based on the peers of the nodes. Anomalous nodes may be further detected based on partially available feedback data. The described system addresses a frequently encountered challenge when conducting anomaly detection, e.g., feedback sparsity. The described system further addresses a challenge with multilayer graphs, e.g., finding consensus of the multiple clusters.

In some real-world applications, it may be unnatural to assume that one single layer in a graph encapsulates all required information. It may also be less convenient when operating on a single graph with all types of information aggregated together. For example, when considering anomalous nodes based on different types of edges, having all types of edges together makes it hard to conduct clustering on the graphs and extract peers and communities based on the specified edge type. Moreover, when post-aggregating different types of anomalies, without differentiating between the connection types, it may be challenging to assign meaningful weights to anomalies generated by different types of connection. The described system addresses these issues.

Provided below is a definition of the technical problem and a system overview for the disclosed methodology. Let a multilayer graph be G=(V, E), where the graph consists of nodes V={$v_1, \ldots, v_n$}, which are common throughout all the layers in G, and edges E={$E_1, \ldots, E_m$}, each of which correspond to one of the m layers in the graph, and each $E_i$ is an edge set. Moreover, $E_i \in E$ stores edge information for its corresponding layer. The notation $G_i=(V, E_i)$ may be used to denote the i-th layer graph and a to denote the attribute associated with $v_i$. For a node (e.g., a user) v, it may be assumed that the majority of the time it behaves similarly as its peers, which exhibits similar behaviors in the multilayer graph G. As described herein, "peers" of a node v may refer to the set of nodes V which exhibit behaviors similar to v, or are closely connected to v in a graph. The peers of node $v_i \in V$ are the set of $n_p$ nodes $V_i' \subset V$ strongly connected to $v_i$ in a given single layer graph G=(V, E). The notation E[i,j] may be used to denote the edge weight between node $v_i$ and its peer $v_j$. Each layer of a multilayer graph may model one type of relationship among the nodes.

There may exist a merged graph that reveals each node's peers. A merged graph $G_{merge}=(V,E_{merge})$ of a multilayer graph G with m layers may be a single layer graph that (i) is generated by merging the layers in G, e.g., $G_{merge}$=merge ($G_1, \ldots, G_m$) and (ii) contains peer relationship information.

User nodes that are peers may be highly likely to be consistently similar throughout all of the m layers in G. If a node v appears significantly different from its peers in specific layers in G, it may be assumed that v is a potential anomaly. Following such logic, a goal of this framework is that given a multilayer graph as input, nodes may be scored according to anomalousness. To achieve this, a framework described herein may include process stages of layer merger, anomaly detection, and optimization.

With specific reference to FIG. 1, depicted is a process diagram for multi-layer graph anomaly detection according to some non-limiting embodiments or aspects. The disclosed method may include three process stages: a layer merger stage 16, an anomaly detection stage 28, and an optimization stage 34. A stage of a process, as used herein, may refer to a series of steps of a method to be carried out by one or more processors. Any stage may be executed by a same or different set of processors.

The system may work as follows. In the layer merger stage 16, the system combines a multilayer graph 10*a*, 10*b*, 10*c*, 10*m* into a single layer graph based on the learned weights $\overline{w}_i$'s using the weighted-sum merge function (see Formula 1, below). In the anomaly detection stage 28, the system may determine a node's peers (step 20) and compute an anomaly score 26 of each node using its attribute 24 and peer attribute(s) 22 given by the merged graph (see Formula 8, below). In the optimization stage 34, the system may refine the weights used in the merge function. Training environments for the weights in the optimization stage may be unsupervised or semi-supervised. In a fully unsupervised training mode, the weights may be optimized both by a deep embedded clustering (DEC) loss model 36 (see Formula 2, below) and an alignment loss model 38 (see Formula 6, below). When the training environment includes human feedback, weights may be refined using a ranking loss model (see Formula 11, below) using labels provided by an investigator (e.g., a user interacting with and operating, at least partly, the anomaly detection system).

In the layer merger stage 16, the layer merger algorithm used to generate a merged graph 14 may include a weighted-sum merge function. The weighted-sum merge function merges layers by computing the weighted sum of an adjacency matrix 12*a*,12*b*,12*c*, 12*m* of each layer, e.g., $E_{merge}=w_1E_1+ \ldots +w_mE_m$, where:

$$w_i = \frac{e^{\overline{w}_i}}{\sum_j e^{\overline{w}_j}} \qquad \text{Formula 1}$$

and $\overline{w}_i$ of each $E_i$ are learnable parameters. To learn these weights, the system may solve the peer grouping problem. The objective of the peer grouping problem is to cluster nodes of a given graph G into k groups. Specifically, the deep embedding clustering (DEC) loss function, defined below, may be optimized:

$$\mathcal{L}_{DEC} = \sum_i \sum_j p_{ij} \log \frac{p_{ij}}{q_{ij}} \qquad \text{Formula 2}$$

where the $q_{ij}$ and $p_{ij}$ are the soft and hard cluster assignments. The soft cluster assignment may be defined by the similarity between a given node i (e.g., $v_i$), and cluster centroid j (e.g., $c_j$) measured with Student's t-distribution as follows:

$$q_{ij} = \frac{\sum_{j'} 1 + \|v_i - c_{j'}\|^2}{1 + \|v_i - c_j\|^2} \qquad \text{Formula 3}$$

The degree of freedom may be set to 1 when computing the similarity with Student's t-distribution. The hard cluster assignment may be computed as follows:

$$p_{ij} = \frac{q_{ij}^2 / \sum_{i'} q_{i'j}}{\sum_{j'} q_{ij'}^2 / \sum_{i'} q_{i'j'}} \qquad \text{Formula 4}$$

The initial cluster centroid may be computed using a k-means clustering algorithm. When computing both the $q_{ij}$ and the initial centroid, each node $v_i \in V$ may be represented as a vector indicating vis connectivity with other nodes in V. In other words, $v_i$ may be represented by the i-th row of $E_{merge}$, and the distance between $v_i$ and $v_j$ may be computed as follows:

$$\|\varepsilon_{merge}[i,:] - \varepsilon_{merge}[j,:]\|^2 \qquad \text{Formula 5:}$$

In addition to DEC loss 36, the alignment loss 38 may be optimized. Alignment loss 38 attempts to align the node attribute with the clustering of nodes (e.g., nodes belonging to the same cluster should have similar attribute values). The alignment loss 38 of a pair of nodes (e.g., $v_i$ and $v_j$) may be computed as follows:

$$\mathcal{L}_{align} = \text{similarity } (a_i, a_j) \log \sum_l q_{il} q_{jl} \qquad \text{Formula 6}$$

where similarity( ) is a function that outputs the similarity between $v_i$'s attribute $a_i$ and $v_j$'s attribute $a_j$. It will be appreciated that any function that returns non-negative similarity may be used. In the described system, similarity may be computed by converting the difference to similarity, such as:

$$\alpha_{max} - \text{abs}(\alpha_i - \alpha_j) \qquad \text{Formula 7}$$

where $a_{max}$ is the maximum possible difference between any pairs of nodes' attributes. Both $q_{il}$ and $q_{jl}$ may be computed with Formula 3 (above).

To obtain the final anomaly score of node the following formula may be used, which is based on vis peer in the merged graph (e.g., $V_i'$) and its attribute a:

$$s_i = \frac{|a_i - \mu_i|}{\sigma_i} \qquad \text{Formula 8}$$

where $\mu_i$ and $\sigma_i$ may be computed by:

$$\mu_i = \frac{\sum_{v_j \in V_i'} \mathcal{E}[i,j] a_j}{\sum_{v_j \in V_i'} \mathcal{E}[i,j]} \qquad \text{Formula 9}$$

and $$\sigma_i = \sqrt{\frac{\sum_{v_j \in V_i'} \mathcal{E}[i,j](a_j - \mu_i)}{\sum_{v_j \in V_i'} \mathcal{E}[i,j]}} \qquad \text{Formula 10}$$

As shown above, $\mu_i$ and $\sigma_i$ are the weighted mean and standard deviation for attributes of $v_i$'s peers; $v_i$ and may have a high anomaly score when its attribute differs greatly when compared to its peers.

In the case where a small set of labeled anomalous nodes is provided by an investigator as feedback 32, a ranked loss model 30 may be employed as follows:

$$\mathcal{L}_{rank} = \max(V_0 - V_1, 0) \qquad \text{Formula 11:}$$

where $V_0$ is the mini-batch samples from the labeled normal nodes and $V_1$ is the mini-batch samples from the labeled anomalous nodes. The ranking loss may help the model learn a better set of layer merging weights $w_i$ for revealing anomalous nodes. The overall loss computed by the system, which takes into account DEC loss 36, alignment loss 38, and ranked loss 30, may be represented as follows:

$$\mathcal{L} = \alpha \mathcal{L}_{DEC} + \beta \mathcal{L}_{align} + \gamma \mathcal{L}_{rank} \qquad \text{Formula 12:}$$

where $\alpha$, $\beta$, and $\gamma$ are hyperparameters to trade-off the contribution of different terms.

The above-described method and stages may be employed for both synthetic and real-world datasets. Three parameters may be imposed for data to be used in the system described herein. The first parameter may include the ability of the data to be formatted as a graph. As long as there exists at least one relationship between either the same type or different types of entities, a graph of the data may be generated. Entities (e.g., users, accounts, merchants, payment devices, etc.) may be formulated as nodes and the relationships may be represented by edges. Edges may be directed or undirected and weighted or unweighted. The graph must be capable of being transformed into adjacency matrices, as described above.

The second parameter may include the ability of the graphed data to be split into multiple layers. Sets of nodes may be identical across multiple layers and the data may include multiple ways of splitting up a single graph into multiple layers, e.g., by the types of the edges, by the timestamps of the edges, and/or the like. The third parameter may include the existence of anomalies in the data. Because the presently described system is an anomaly-detection system, it is presumed that the data will include meaningful anomalies to be detected. For example, for nodes that represent users, anomalies may include malicious employees inside of organizations, compromised user accounts, fraudulent user activity, and/or the like. For nodes that represent sensors in a network of sensors, an anomaly may include a malfunctioning sensor. It will be appreciated that the type of anomaly may vary and may depend on the system to be analyzed.

A fourth parameter may be imposed for semi-supervised learning methods, which may require the availability of anomaly feedback. With respect to the availability of anomaly feedback, the dataset may also contain feedback of anomalies, e.g., ground truths of the anomalies. If feedback is not directly available, it may be acceptable that true anomalies can be reasonably derived from the dataset.

Non-Limiting Embodiments and Aspects

Figure 2:
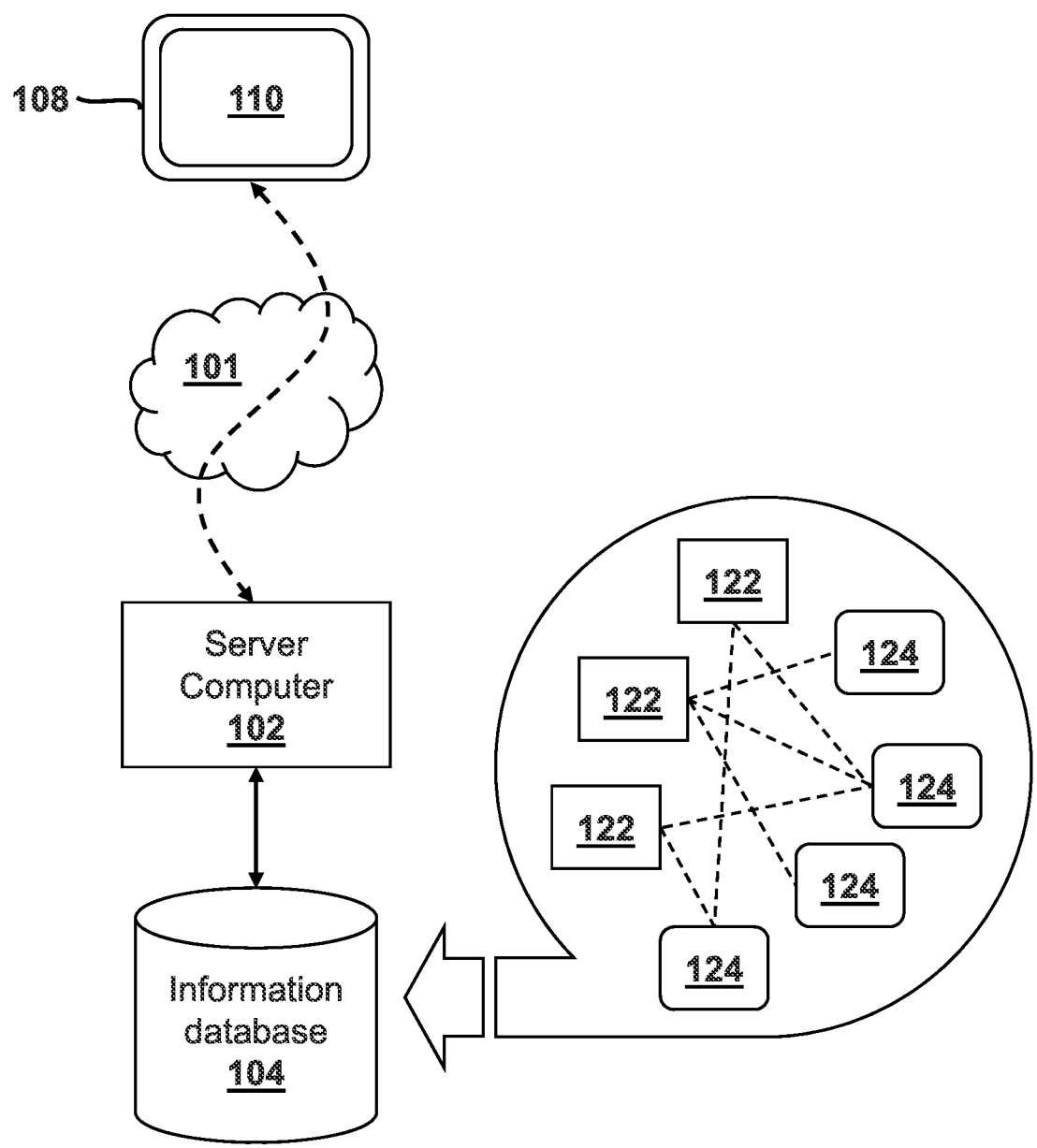
FIG. 2 is a schematic diagram of a system for multi-layer graph anomaly detection according to some non-limiting embodiments or aspects.

Referring now to FIG. 2, a system 1000 for multi-layer graph anomaly detection is shown according to some non-limiting embodiments or aspects. A computing device 108 is in communication with a server computer 102 via a network environment 101, such as the Internet or a private network. The server computer 102 is in communication with a data storage device including an information database 104. The server computer 102 may be associated with and/or included in a fraud detection and/or mitigation system. The information database 104 may include one or more sets of data associated with activity of at least two nodes 122. Each node may represent a different entity, such as a person, a user, a computing device, a transaction account, and/or the like. The one or more sets of data may include network resource data associated with activity related to and/or with network resources 124 (e.g., cybersecurity data) of users such as, for example, email transactions of each node, website traffic of each node, access requests for hardware and/or software, and/or the like. The server computer 102 may include the information database 104.

The server computer 102 may generate a multi-layer graph based on the one or more sets of information, each set of data being used to generate its own layer in the multi-layer graph. Each layer of the multi-layer graph may contain a set of nodes connected by a set of edges generated from data for each node contained therein. The server computer 102 may generate an adjacency matrix for each layer of the multi-layer graph. The layer merger algorithm may apply a weight to each adjacency matrix and be based on the weighted adjacency matrices. The server computer 102 may generate a merged single layer graph based on the layer merger algorithm and an anomaly score of each node based on attributes (e.g., network resource activity data parameters, such as activity time, resource interacted with, computer resource size/bandwidth, etc.) of the node and of the node's peers. The server computer 102 may rank all nodes based on the anomaly score. The server computer 102 may determine an initial anomaly assessment of each node based on the ranked anomaly score. The server computer 102 may determine a set of anomalous nodes based on the initial anomaly assessment.

With continued reference to FIG. 2, the computing device 108 may display a GUI 110 based on data received from the server computer 102. The GUI 110 may include one or more windows (e.g., a first GUI, a second GUI, a third GUI, etc.) within a main GUI or as separate GUIs. The GUI 110 may display the multiple graph layers, a merged single layer graph, and/or anomaly scores to the user. The user may provide feedback to the server computer 102 via the GUI 110 to alter the graphs or anomaly score/ranking of one or more nodes and/or to provide feedback of known node labels (e.g., anomalous user, non-anomalous user, etc.). The server computer 102 may regenerate the weights of the adjacency matrices, regenerate the merged single layer graph, and regenerate the anomaly scores of each node based on the feedback provided by the user.

Figure 3:
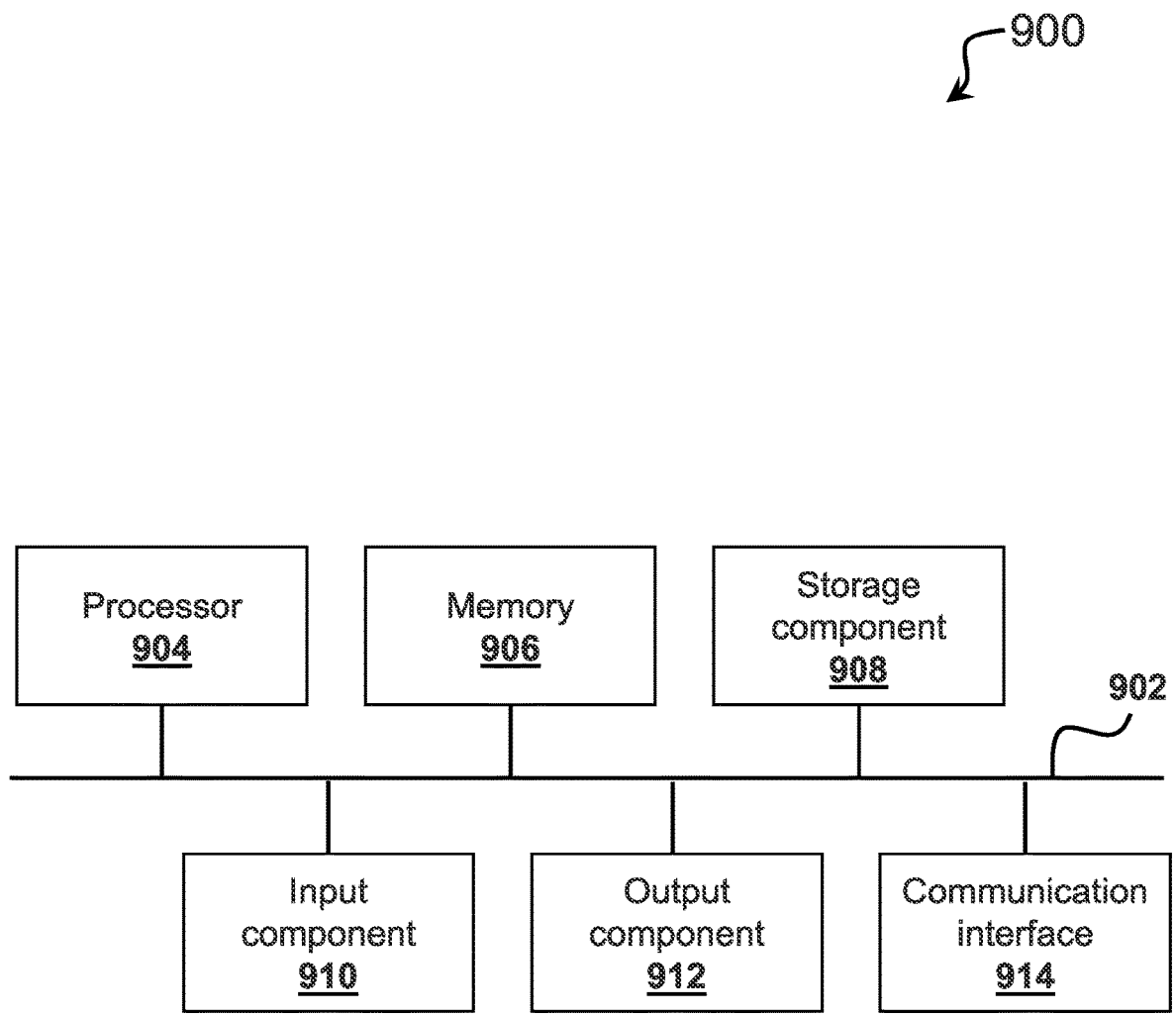
FIG. 3 is a diagram of one or more components, devices, and/or systems according to some non-limiting embodiments or aspects.

Referring now to FIG. 3, shown is a diagram of example components of a device 900 according to some non-limiting embodiments or aspects. Device 900 may correspond to one or more devices of the computing device 108, the server computer 102, the communication network 101, the information database 104, the nodes 122, the network resources 124, and/or the like, as shown in FIG. 2. In some non-limiting embodiments or aspects, such systems or devices may include at least one device 900 and/or at least one component of device 900. The number and arrangement of components shown in FIG. 3 are provided as an example. In some non-limiting embodiments or aspects, device 900 may include additional components, fewer components, different components, or differently arranged components than those shown in FIG. 3. Additionally, or alternatively, a set of components (e.g., one or more components) of device 900 may perform one or more functions described as being performed by another set of components of device 900.

As shown in FIG. 3, device 900 may include a bus 902, a processor 904, memory 906, a storage component 908, an input component 910, an output component 912, and a communication interface 914. Bus 902 may include a component that permits communication among the components of device 900. In some non-limiting embodiments or aspects, processor 904 may be implemented in hardware, firmware, or a combination of hardware and software. For example, processor 904 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 906 may include random access memory (RAM), read only memory (ROM), and/or another type of dynamic or static storage device (e.g., flash memory, magnetic memory, optical memory, etc.) that stores information and/or instructions for use by processor 904.

With continued reference to FIG. 3, storage component 908 may store information and/or software related to the operation and use of device 900. For example, storage component 908 may include a hard disk (e.g., a magnetic disk, an optical disk, a magneto-optic disk, a solid state disk, etc.) and/or another type of computer-readable medium. Input component 910 may include a component that permits device 900 to receive information, such as via user input (e.g., a touch screen display, a keyboard, a keypad, a mouse, a button, a switch, a microphone, etc.). Additionally, or alternatively, input component 910 may include a sensor for sensing information (e.g., a global positioning system (GPS) component, an accelerometer, a gyroscope, an actuator, etc.). Output component 912 may include a component that provides output information from device 900 (e.g., a display, a speaker, one or more light-emitting diodes (LEDs), etc.). Communication interface 914 may include a transceiver-like component (e.g., a transceiver, a separate receiver and transmitter, etc.) that enables device 900 to communicate with other devices, such as via a wired connection, a wireless connection, or a combination of wired and wireless connections. Communication interface 914 may permit device 900 to receive information from another device and/or provide information to another device. For example, communication interface 914 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 900 may perform one or more processes described herein. Device 900 may perform these processes based on processor 904 executing software instructions stored by a computer-readable medium, such as memory 906 and/or storage component 908. A computer-readable medium may include any non-transitory memory device. A memory device includes memory space located inside of a single physical storage device or memory space spread across multiple physical storage devices. Software instructions may be read into memory 906 and/or storage component 908 from another computer-readable medium or from another device via communication interface 914. When executed, software instructions stored in memory 906 and/or storage component 908 may cause processor 904 to perform one or more processes described herein. Additionally, or alternatively, hardwired circuitry may be used in place of or in combination with software instructions to perform one or more processes described herein. Thus, embodiments described herein are not limited to any specific combination of hardware circuitry and software. The term "programmed or configured," as used herein, refers to an arrangement of software, hardware circuitry, or any combination thereof on one or more devices.

Figure 4:
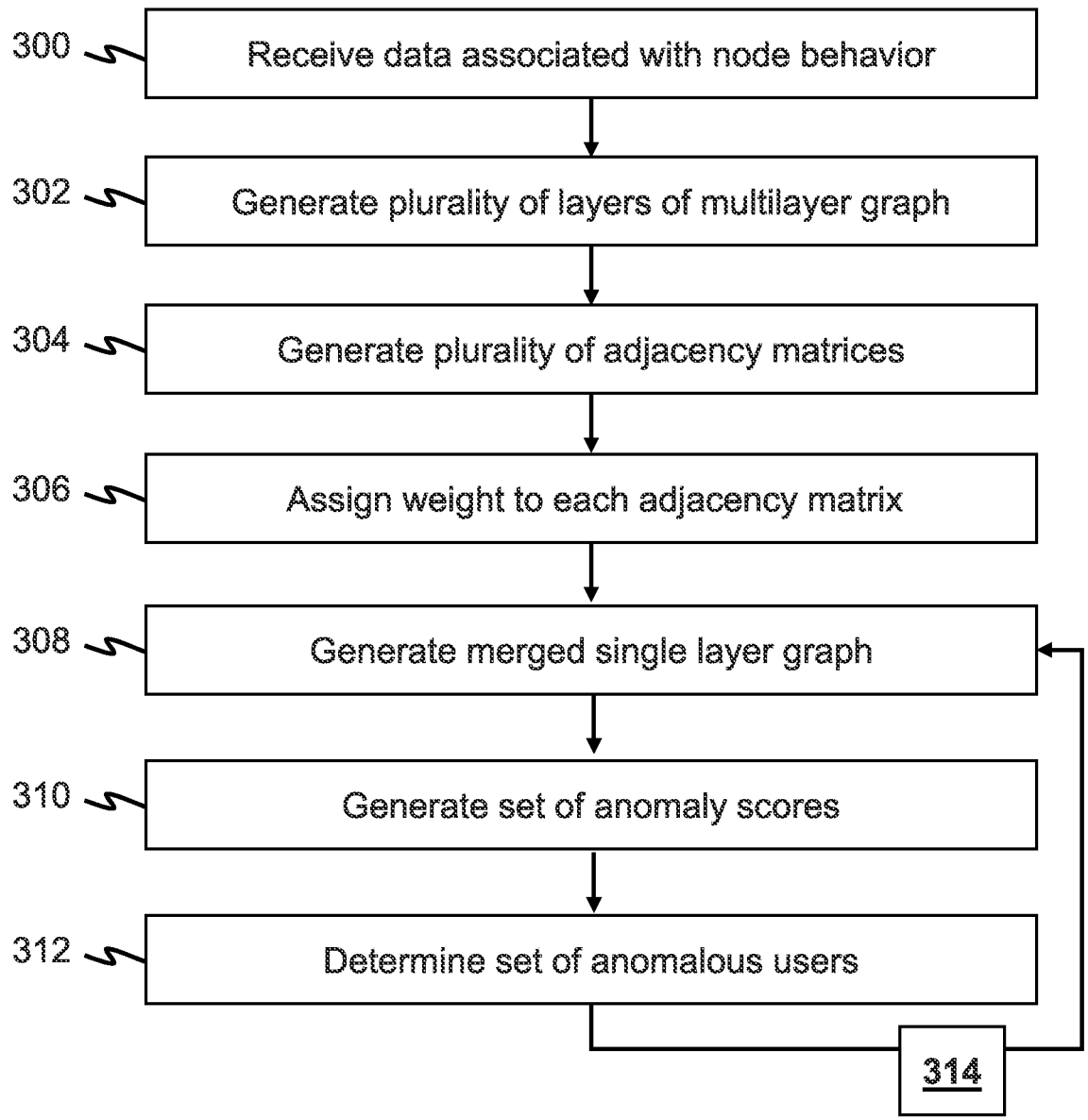
FIG. 4 is a flow diagram of a method for multi-layer graph anomaly detection according to some non-limiting embodiments or aspects.

Referring now to FIG. 4, a flow diagram of a method for multi-layer graph anomaly detection is shown according to some non-limiting embodiments or aspects of the present disclosure. The method may be performed by one or more processors of the server computer 102, information database 104, and/or other computing device. One or more steps performed by a first processor may be performed by a same or different processor.

In step 300, data associated with node behavior may be received. For example, the server computer 102 may receive network resource data associated with network resource activity (e.g., one or more communications to and/or from) of a plurality of users (e.g., nodes) on a network comprising at least one network resource (e.g., hardware and/or software of a networked computing device). In an organizational structure, the nodes may be employees and the network resource activity may be types of communications with various networked devices within the organization. In an electronic payment processing network, the nodes may be transaction accounts and the network resource activity may be transactions with one or more devices of a merchant, issuer, payment gateway, and/or transaction service provider.

In step 302, a plurality of layers of a multilayer graph may be generated. For example, the server computer 102 may generate a plurality of layers of a multilayer graph from the network resource data of network resource activity. Each layer of the plurality of layers may include a plurality of nodes connected by a plurality of edges. Each node of the plurality of nodes may be associated with a user of the plurality of users. Each edge of the plurality of edges may represent an interdependency (e.g., statistical relationship, shared attribute, etc., such as similar resource access) of the nodes. Each layer may represent interdependencies of nodes according to a unique parameter (e.g., time, resource identifier, communication channel, user computing device type, etc.) of network resource activity.

In step 304, a plurality of adjacency matrices may be generated. For example, the server computer 102 may generate an adjacency matrix (e.g., distance matrix) associated with each layer of the plurality of layers to produce a plurality of adjacency matrices.

In step 306, a weight may be assigned to each adjacency matrix. For example, the server computer 102 may assign a weight to each adjacency matrix of the plurality of adjacency matrices to produce a plurality of weights. The weights may be reassigned/regenerated with repeated testing of the anomaly detection model, such as through unsupervised and/or semi-supervised testing methods.

In step 308, a merged single layer graph may be generated. For example, server computer 102 may generate a merged single layer graph by merging the plurality of layers based on a weighted sum of the plurality of adjacency matrices using the plurality of weights. The merged single layer graph may include a merged set of nodes.

In step 310, a set of anomaly scores may be generated. For example, server computer 102 may generate a set of anomaly scores by generating, for each node in the merged set of nodes, an anomaly score based on an attribute of the node and at least one attribute of at least one peer node to which the node is connected in the merged set of nodes. A node's peer may have a strong interdependency to the evaluated node.

In step 312, a set of anomalous users may be determined. For example, server computer 102 may determine a set of anomalous users of the plurality of users based on the set of anomaly scores. For example, the value of a node's anomaly score may be compared to a threshold, and if the threshold is satisfied, based on the node's correspondence to a user in the network, the anomalous user's identity can be determined. The threshold may be predetermined or dynamic, such as based on a statistical variance/deviation from a mean value.

In step 314, the plurality of weights may be modified. For example, the server computer 102 may modify the plurality of weights based on at least one loss function (e.g., DEC loss, alignment loss, ranked loss, etc.) to produce a modified plurality of weights. In response to step 314, the method may proceed back to step 308, in which an updated merged single layer graph is generated. For example, the server computer 102 may generate an updated merged single layer graph by merging the plurality of layers based on a weighted sum of the plurality of adjacency matrices using the modified plurality of weights. The method may then proceed to step 310, in which a new set of anomaly scores is generated. For example, the server computer 102 may generate a new set of anomaly scores based on the updated merged single layer graph. The method may then proceed to step 312, in which the set of anomalous users is updated. For example, the server computer 102 may update the set of anomalous users based on the new set of anomaly scores. It will be appreciated that the above cycle of steps 308, 310, 312, and 314 may be repeated at regular intervals, triggers, and/or the like, including after making adjustments to various weights, hyperparameters, and/or the like pursuant to a learning method.

Further to the above, the at least one loss function of step 314 may be a weighted sum of two or more loss functions (e.g., DEC loss, alignment loss, etc.). The two or more loss functions may be based at least partly on the merged single layer graph. Steps 308, 310, 312, and 314 may be repeatedly executed in an unsupervised training environment by altering weights of the weighted sum of the two or more loss functions before each new execution of step 314.

Further to the above, the at least one loss function of step 314 may be a weighted sum of two or more loss functions including at least one loss function that is based at least partly on input feedback of externally identified anomalous nodes (e.g., independent determination by an individual or a system of predetermined anomalous users). Steps 308, 310, 312, and 314 may be repeatedly executed in a semi-supervised training environment by receiving new input feedback of externally identified anomalous nodes and by altering weights of the weighted sum of the two or more loss functions before each new execution of step 314.

Figure 5:
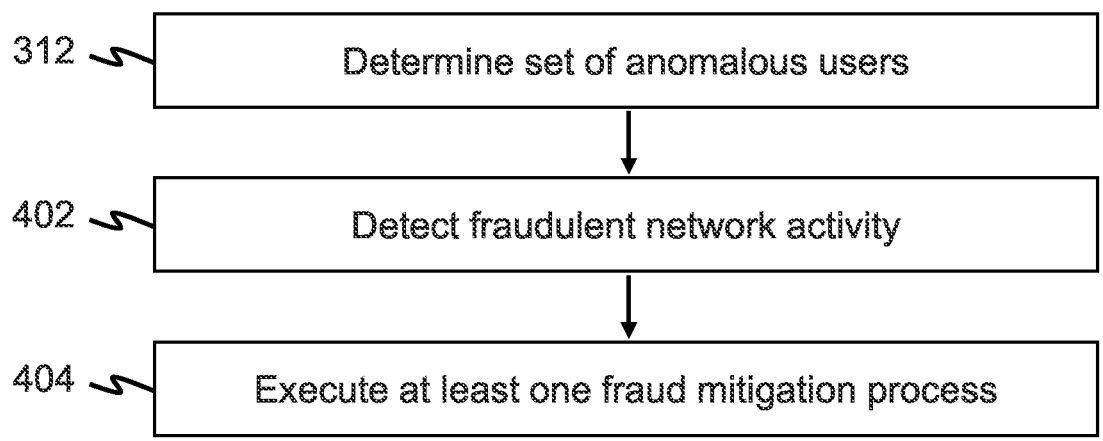
FIG. 5 is a flow diagram of a method for multi-layer graph anomaly detection according to some non-limiting embodiments or aspects.

Referring now to FIG. 5, a flow diagram of a method for multi-layer graph anomaly detection is shown according to some non-limiting embodiments or aspects of the present disclosure. The method may be performed by one or more processors of the server computer 102, information database 104, and/or other computing device. One or more steps performed by a first processor may be performed by a same or different processor.

After determining a set of anomalous users in step 312 (see also FIG. 4), fraudulent network activity (e.g., transactional fraud, nefarious network activity, etc.) may be detected in step 402. For example, server computer 102 may detect fraudulent network activity based on the set of anomalous users. Data of the network resource activity may be retrieved and evaluated based on the provided set of anomalous users (e.g., compared to evaluating all of the network activity separately), which may reduce the overall computational resource use and time required to detect fraud in the network. In response to detecting fraudulent network activity, at least one fraud mitigation process may be executed in step 404. For example, server computer 102 may prevent further network communications associated with computing devices (e.g., payment devices) of the anomalous user, throttle a number of type of communications associated with the anomalous user, restrict access to network resources for the anomalous user, and/or the like. In doing so, computer resource loss may be mitigated and taxing network activity caused by abnormally high network resource activity may be resolved.

Evaluation of Methodology on Synthetic Data

The foregoing system and method were evaluated against a synthetic dataset to simulate a six-layer graph based on a scenario of 500 users (nodes) accessing resources within an organization. If two users access the same resource, there may exist an undirected weighted edge between them (R1 and R2).

The weight for the layer merge stage 16 was initialized with a random number. The initial merging weight was used to obtain the merged graph $G_{merge}$. With the initial merged graph $G_{merge}$, the initial clustering centroids were computed with a k-mean clustering algorithm. The weight $\overline{W}$ was trained for $n_{iter}$ iterations. In a supervised learning environment, the algorithm would display the top h=10 and bottom h=10 nodes (based on each node's current anomaly score estimated using current $G_{merge}$) to the user and ask the user to annotate the 2h provided nodes. The value h is a hyperparameter which may be set based on how many labels are requested in feedback. The supervised learning environment may or may not ask for feedback every iteration, but may stagger requests for feedback to every few iterations or more. The number of iterations between feedback may be set based on the level of supervision required. After obtaining feedback, $\overline{W}$ was updated based on the overall loss (see Formula 12), and $G_{merge}$ was regenerated with the updated $\overline{W}$. After multiple iterations, the learned $\overline{W}$ was returned to the user as the selected context for the anomaly detection problem.

Six layers were generated for the multilayer graph with three good layers being relevant to the anomaly detection task and three bad layers being irrelevant. The 500 users formed five clusters when considering only the three relevant layers. This provided the expectation that the final learned weights for the good layers should be higher than the bad layers.

For each user node, peers were determined by identifying the 50 closest user nodes to the subject user node. For each cluster of the five clusters, a mean and standard deviation were randomly assigned to form a Gaussian distribution, which further assigned the attribute for the users in that cluster (R3). In order to injected anomalous users, a subset of users (5%) were varied to have an associated attribute be three standard deviations away based on the Gaussian distribution of the user's cluster. Feedback labels were also generated for the nodes (R4), based on the injected anomalies.

Sensitivity analysis was conducted in both supervised (while changing hyperparameters $\alpha$ and $\beta$) and unsupervised settings (while changing hyperparameters $\alpha$, $\beta$, and $\gamma$) for the synthetic dataset. The described system's performance was compared against a peer-grouping baseline which used a single graph layer for peer selection, which may be any of the individual graph layers or an average layer of all individual layers. Performance was evaluated using the area under the curve (AUC) score.

The baseline methods performed as follows, taking each of the layers and the average of all layers in turn:

TABLE 1

| Graph | AUC |
| --- | --- |
| Ground truth | 1.0000 |
| Average | 0.4370 |
| Layer 0 | 0.4500 |
| Layer 1 | 0.5438 |
| Layer 2 | 0.5063 |
| Layer 3 | 0.4527 |
| Layer 4 | 0.4969 |
| Layer 5 | 0.4917 |

As shown in Tables 2-5, below, the described system generally outperforms the baseline methods in both supervised and unsupervised settings. Each of Tables 2-5 shows AUC scores for the described system given varied hyperparameters $\alpha$ (rows) and $\beta$ (columns). Table 2 reflects performance of the described system for an unsupervised method where $\gamma=0$ and $\alpha$ and $\beta$ are varied at values of 0.0, 0.1, 1.0, and 10.0.

TABLE 2

| | | $\beta$ | | | |
| --- | --- | --- | --- | --- | --- |
| | | 0.0 | 0.1 | 1.0 | 10.0 |
| $\alpha$ | 0.0 | — | 0.9992 | 0.9972 | 0.9983 |
| | 0.1 | 0.7817 | 0.9984 | 0.9985 | 0.9978 |
| | 1.0 | 0.9990 | 0.8908 | 0.9981 | 0.9997 |
| | 10.0 | 0.7964 | 0.7972 | 0.8538 | 0.9979 |

Table 3 reflects performance of the described system for a semi-supervised method where $\gamma=0.1$ and $\alpha$ and $\beta$ are varied at values of 0.0, 0.1, 1.0, and 10.0.

TABLE 3

| | | $\beta$ | | | |
| --- | --- | --- | --- | --- | --- |
| | | 0.0 | 0.1 | 1.0 | 10.0 |
| $\alpha$ | 0.0 | — | 0.9991 | 0.9981 | 0.9988 |
| | 0.1 | 0.9992 | 0.9993 | 0.9989 | 0.9983 |
| | 1.0 | 0.8485 | 0.9043 | 0.9993 | 0.9988 |
| | 10.0 | 0.7953 | 0.9976 | 0.9992 | 0.9655 |

Table 4 reflects performance of the described system for a semi-supervised method where $\gamma=1$ and $\alpha$ and $\beta$ are varied at values of 0.0, 0.1, 1.0, and 10.0.

TABLE 4

| | | $\beta$ | | | |
| --- | --- | --- | --- | --- | --- |
| | | 0.0 | 0.1 | 1.0 | 10.0 |
| $\alpha$ | 0.0 | — | 0.9990 | 0.9981 | 0.9987 |
| | 0.1 | 0.7917 | 0.9989 | 0.9991 | 0.9985 |
| | 1.0 | 0.9976 | 0.9362 | 0.9979 | 0.9991 |
| | 10.0 | 0.9984 | 0.8066 | 0.8648 | 0.9992 |

Table 5 reflects performance of the described system for a semi-supervised method where $\gamma=10$ and $\alpha$ and $\beta$ are varied at values of 0.0, 0.1, 1.0, and 10.0.

TABLE 5

| | | $\beta$ | | | |
| --- | --- | --- | --- | --- | --- |
| | | 0.0 | 0.1 | 1.0 | 10.0 |
| $\alpha$ | 0.0 | — | 0.9205 | 0.9982 | 0.9992 |
| | 0.1 | 0.5216 | 0.5589 | 0.9982 | 0.9995 |
| | 1.0 | 0.5012 | 0.8497 | 0.9995 | 0.9987 |
| | 10.0 | 0.9012 | 0.9987 | 0.8339 | 0.9992 |

In addition to evaluating the described system by AUC scores, the described system was evaluated by predicting the values of layer weights. For the ground truth of the synthetic data set, the layer weights were assigned to be 0.2508, 0.3857, 0.3635, 0.0000, 0.0000, and 0.0000, indicating the first three layers are good layers, while the rest are bad layers. The described system was able to predict that the layer weight values were 0.2470, 0.3852, 0.3602, 0.0025, 0.0024, and 0.0027, which was very close to the initially set values. In summary, the described system has shown improved performance in detecting anomalies, which will result in network efficiencies resulting from both accuracy in detection and mitigation thereof.

Although the disclosure has been described in detail for the purpose of illustration based on what is currently considered to be the most practical and preferred embodiments or aspects, it is to be understood that such detail is solely for that purpose and that the disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment, and one or more steps may be taken in a different order than presented in the present disclosure.

What is claimed is:

1. A computer-implemented method comprising:
generating, with at least one processor, a plurality of layers of a multilayer graph from network resource data associated with network resource activity of a plurality of users on a network comprising at least one network resource, wherein each layer of the plurality of layers comprises a plurality of nodes connected by a plurality of edges, each node of the plurality of nodes is associated with a user of the plurality of users, each edge of the plurality of edges represents an interdependency of nodes, and each layer represents interdependencies of nodes according to a unique parameter of network resource activity;
generating, with at least one processor, an adjacency matrix associated with each layer of the plurality of layers to produce a plurality of adjacency matrices;
assigning, with at least one processor, a weight to each adjacency matrix of the plurality of adjacency matrices to produce a plurality of weights;
generating, with at least one processor, a merged single layer graph by merging the plurality of layers based on a weighted sum of the plurality of adjacency matrices using the plurality of weights, the merged single layer graph comprising a merged set of nodes;
generating, with at least one processor, a set of anomaly scores by generating, for each node in the merged set of nodes, an anomaly score based on an attribute of said node and at least one attribute of at least one peer node to which said node is connected in the merged set of nodes;
determining, with at least one processor, a set of anomalous users of the plurality of users based on the set of anomaly scores
detecting, with at least one processor, fraudulent network activity based on the set of anomalous users; and
in response to detecting fraudulent network activity, executing, with at least one processor, at least one fraud mitigation process.

2. The computer-implemented method of claim 1, further comprising executing, with at least one processor, an update process, wherein executing the update process comprises:
modifying the plurality of weights based on at least one loss function to produce a modified plurality of weights;
generating an updated merged single layer graph by merging the plurality of layers based on a weighted sum of the plurality of adjacency matrices using the modified plurality of weights;
generating a new set of anomaly scores based on the updated merged single layer graph; and
updating the set of anomalous users based on the new set of anomaly scores.

3. The computer-implemented method of claim 2, wherein the at least one loss function comprises a weighted sum of at least two loss functions, and wherein the at least two loss functions comprises a loss function based at least partly on the merged single layer graph.

4. The computer-implemented method of claim 3, wherein the at least two loss functions further comprise a loss function based at least partly on input feedback of externally identified anomalous users.

5. The computer-implemented method of claim 3, further comprising repeatedly executing the update process in an unsupervised training environment by altering weights of the weighted sum of the at least two loss functions before each new execution of the update process.

6. The computer-implemented method of claim 4, further comprising repeatedly executing the update process in an at least partly supervised training environment by receiving new input feedback of externally identified anomalous users and by altering weights of the weighted sum of the at least two loss functions before each new execution of the update process.

7. The computer-implemented method of claim 1, wherein detecting the fraudulent network activity based on the set of anomalous users comprises:
retrieving a portion of the network resource data associated with network resource activity of the set of anomalous users; and
detecting the fraudulent network activity based on the portion of the network resource data.

8. A system comprising:
a server comprising at least one hardware processor, the server being programmed or configured to:
generate a plurality of layers of a multilayer graph from network resource data associated with network resource activity of a plurality of users on a network comprising at least one network resource, wherein each layer of the plurality of layers comprises a plurality of nodes connected by a plurality of edges, each node of the plurality of nodes is associated with a user of the plurality of users, each edge of the plurality of edges represents an interdependency of nodes, and each layer represents interdependencies of nodes according to a unique parameter of network resource activity;
generate an adjacency matrix associated with each layer of the plurality of layers to produce a plurality of adjacency matrices;
assign a weight to each adjacency matrix of the plurality of adjacency matrices to produce a plurality of weights;
generate a merged single layer graph by merging the plurality of layers based on a weighted sum of the plurality of adjacency matrices using the plurality of weights, the merged single layer graph comprising a merged set of nodes;
generate a set of anomaly scores by generating, for each node in the merged set of nodes, an anomaly score based on an attribute of said node and at least one attribute of at least one peer node to which said node is connected in the merged set of nodes;
determine a set of anomalous users of the plurality of users based on the set of anomaly scores;
detect fraudulent network activity based on the set of anomalous users; and in response to detecting fraudulent network activity, execute at least one fraud mitigation process.

9. The system of claim 8, wherein the server is further programmed or configured to execute an update process, wherein, when executing the update process, the server is programmed or configured to:
modify the plurality of weights based on at least one loss function to produce a modified plurality of weights;
generate an updated merged single layer graph by merging the plurality of layers based on a weighted sum of the plurality of adjacency matrices using the modified plurality of weights;
generate a new set of anomaly scores based on the updated merged single layer graph; and
update the set of anomalous users based on the new set of anomaly scores.

10. The system of claim 9, wherein the at least one loss function comprises a weighted sum of at least two loss functions, and wherein the at least two loss functions comprises a loss function based at least partly on the merged single layer graph.

11. The system of claim 10, wherein the at least two loss functions further comprise a loss function based at least partly on input feedback of externally identified anomalous users.

12. The system of claim 10, wherein the server is further programmed or configured to repeatedly execute the update process in an unsupervised training environment by altering weights of the weighted sum of the at least two loss functions before each new execution of the update process.

13. The system of claim 11, wherein the server is further programmed or configured to repeatedly execute the update process in an at least partly supervised training environment by receiving new input feedback of externally identified anomalous users and by altering weights of the weighted sum of the at least two loss functions before each new execution of the update process.

14. The system of claim 8, wherein, when detecting the fraudulent network activity based on the set of anomalous users, the server is programmed or configured to:
retrieve a portion of the network resource data associated with network resource activity of the set of anomalous users; and
detect the fraudulent network activity based on the portion of the network resource data.

15. A computer program product comprising at least one non-transitory computer-readable medium including one or more instructions that, when executed by at least one processor, cause the at least one processor to:
generate a plurality of layers of a multilayer graph from the network resource data associated with network resource activity of a plurality of users on a network comprising at least one network resource, wherein each layer of the plurality of layers comprises a plurality of nodes connected by a plurality of edges, each node of the plurality of nodes is associated with a user of the plurality of users, each edge of the plurality of edges represents an interdependency of nodes, and each layer represents interdependencies of nodes according to a unique parameter of network resource activity;
generate an adjacency matrix associated with each layer of the plurality of layers to produce a plurality of adjacency matrices;
assign a weight to each adjacency matrix of the plurality of adjacency matrices to produce a plurality of weights;
generate a merged single layer graph by merging the plurality of layers based on a weighted sum of the plurality of adjacency matrices using the plurality of weights, the merged single layer graph comprising a merged set of nodes;
generate a set of anomaly scores by generating, for each node in the merged set of nodes, an anomaly score based on an attribute of said node and at least one attribute of at least one peer node to which said node is connected in the merged set of nodes;
determine a set of anomalous users of the plurality of users based on the set of anomaly scores;
detect fraudulent network activity based on the set of anomalous users; and
in response to detecting fraudulent network activity, execute at least one fraud mitigation process.

16. The computer program product of claim 15, wherein the one or more instructions further cause the at least one processor to execute an update process, wherein the one or more instructions that cause the at least one processor to execute the update process cause the at least one processor to:
modify the plurality of weights based on at least one loss function to produce a modified plurality of weights;
generate an updated merged single layer graph by merging the plurality of layers based on a weighted sum of the plurality of adjacency matrices using the modified plurality of weights;
generate a new set of anomaly scores based on the updated merged single layer graph; and
update the set of anomalous users based on the new set of anomaly scores.

17. The computer program product of claim 16, wherein the at least one loss function comprises a weighted sum of at least two loss functions, and wherein the at least two loss functions comprises a loss function based at least partly on the merged single layer graph.

18. The computer program product of claim 17, wherein the at least two loss functions further comprises a loss function based at least partly on input feedback of externally identified anomalous users.

19. The computer program product of claim 18, wherein the one or more instructions further cause the at least one processor to repeatedly execute the update process in an at least partly supervised training environment by receiving new input feedback of externally identified anomalous users and by altering weights of the weighted sum of the at least two loss functions before each new execution of the update process.

20. The computer program product of claim 15, wherein the one or more instructions that cause the at least one processor to detect the fraudulent network activity based on the set of anomalous users cause the at least one processor to:
retrieve a portion of the network resource data associated with network resource activity of the set of anomalous users; and
detect the fraudulent network activity based on the portion of the network resource data.

* * * * *